(12) United States Patent
Davies et al.

(10) Patent No.: US 8,826,768 B2
(45) Date of Patent: Sep. 9, 2014

(54) STEERING COLUMN ASSEMBLY

(71) Applicant: TRW Limited, Solihull (GB)

(72) Inventors: Nic Davies, Birmingham (GB); Mark Wilkes, Birmingham (GB)

(73) Assignee: TRW Limited, West Midlands (GB)

( * ) Notice: Subject to any disclaimer, the term of this patent is extended or adjusted under 35 U.S.C. 154(b) by 90 days.

(21) Appl. No.: 13/723,259

(22) Filed: Dec. 21, 2012

(65) Prior Publication Data

US 2013/0276569 A1 Oct. 24, 2013

(30) Foreign Application Priority Data

Dec. 21, 2011 (GB) .................................. 1121983.9

(51) Int. Cl.
*B60R 25/02* (2013.01)
*B62D 1/16* (2006.01)
*B60R 25/021* (2013.01)
*B60R 25/023* (2013.01)

(52) U.S. Cl.
CPC ............ *B62D 1/16* (2013.01); *B60R 25/02105* (2013.01); *B60R 25/0211* (2013.01); *B60R 25/023* (2013.01)
USPC ............................... 74/492; 280/779; 70/252

(58) Field of Classification Search
CPC ..................... B60R 25/02105; B60R 25/0211; B60R 25/02126; B60R 25/021; B62D 1/16; B62D 1/195
USPC ................ 280/779; 74/492; 70/252; 248/551
See application file for complete search history.

(56) References Cited

U.S. PATENT DOCUMENTS

| | | | | |
|---|---|---|---|---|
| 5,425,553 A | * | 6/1995 | Yazane et al. | 280/777 |
| 7,104,097 B2 | * | 9/2006 | Zillmann | 70/186 |
| 7,316,138 B2 | * | 1/2008 | Goshima et al. | 70/186 |
| 7,328,596 B2 | * | 2/2008 | Hasegawa et al. | 70/186 |
| 7,669,500 B2 | * | 3/2010 | Matsui et al. | 74/493 |
| 7,823,426 B2 | * | 11/2010 | Okuno et al. | 70/186 |
| 7,866,699 B2 | * | 1/2011 | Levin et al. | 280/777 |
| 7,982,334 B2 | * | 7/2011 | Kumano | 307/10.3 |

FOREIGN PATENT DOCUMENTS

| | | |
|---|---|---|
| GB | 2214476 A | 9/1989 |
| GB | 2346354 A | 8/2000 |
| JP | 2009132318 A | 6/2009 |

OTHER PUBLICATIONS

Search Report for Application No. GB1121983.9 dated Apr. 17, 2012.

* cited by examiner

*Primary Examiner* — James English
(74) *Attorney, Agent, or Firm* — MacMillan, Sobanski & Todd, LLC

(57) ABSTRACT

A steering column assembly includes a bracket for securely fixing a steering lock mechanism to the shroud of the steering shaft. The lock mechanism includes a bolt that projects in a locked position to act upon the shaft to limit rotation. The bracket is secured to the shroud in such a way that it is free to move relative to the shroud against a spring force. This helps the lock resist an attack using a high impact force.

11 Claims, 3 Drawing Sheets

STEERING COLUMN ASSEMBLY

CROSS-REFERENCE TO RELATED APPLICATIONS

This application is a national stage of Great Britain Application No. GB 1121983.9 filed Dec. 21, 2011, the disclosures of which are incorporated herein by reference in entirety.

BACKGROUND OF THE INVENTION

This invention relates to improvements in steering column assemblies of the kind which include a steering lock mechanism and which may be fitted to road vehicles and the like.

Steering assemblies are well known in which a steering wheel is connected to one or more road wheels of a vehicle to enable a driver of the vehicle to steer. The steering assemblies generally include a steering column assembly which includes a steering shaft that is supported within a steering column shroud. The shaft is connected at one end to the steering wheel, either directly or indirectly, and at the other end is connected through steering gear to the road wheels of a vehicle. As the driver turns the steering wheel the shaft turns within the shroud, and this causes the road wheels of the vehicle to turn to provide steering of the vehicle. The rotation of the shaft by the driver may be assisted by a hydraulic or electric power source to provide a power assisted steering system, or the steering may be unassisted.

The function of the shroud is to support the steering shaft. It typically comprises a generally elongate, hollow, casting within which the steering shaft extends. It may be in one or two or more parts, and may be generally tubular. The shroud is fixed to a solid part of the vehicle through a mounting bracket, and may in some cases be permitted to move relative to the mounting bracket to permit adjustment of the position of the shroud as required during reach and rake adjustment of the steering wheel. A clamp mechanism permits the shroud to be locked in a preferred position relative to the mounting bracket once adjusted by the driver.

It is also common to fit a steering lock to the steering column assembly which, when locked, acts between the steering column shroud and the steering shaft to prevent rotation of the steering wheel. When unlocked the steering lock permits the shaft to rotate within the shroud. Typically the lock mechanism comprises a lock bolt which may project from a lock mechanism through an opening in the shroud to engage the steering shaft. This helps to prevent theft of the vehicle by immobilising the steering shaft. For convenience the lock is usually bolted to the shroud just below the steering wheel where it can be conveniently locked and unlocked by operation of the ignition key of the vehicle. In some modern vehicles the lock is an electric lock such as a solenoid and locks and unlocks in response to control signals from the vehicle electronic management system.

Unfortunately it is not uncommon for a thief to damage the lock mechanism in order to try to steal the vehicle. There are many forms of attack, but the most common is a brute force attack in which the thief attempts to smash the lock mechanism away from the steering column by striking it with a heavy object such as a hammer. Due to the limited space for accommodating the lock mechanism it is difficult to make the mechanism sufficiently massive and robust to resist this form of attack for a long period of time.

BRIEF SUMMARY OF THE INVENTION

According to a first aspect the invention provides a steering column assembly comprising a steering shaft that is rotatable within a supporting steering column shroud and which includes a bracket for securely fixing to the shroud a steering lock mechanism of the kind having a projecting bolt that acts, when in a locked position, upon the steering shaft to limit the rotation of the shaft, in which: the bracket is secured to the shroud by a connection that permits a limited degree of movement between the bracket and the shroud, the movement being resisted by a resisting force provided by a spring means.

By providing a bracket for the lock mechanism which is connected to the steering column shroud with a limited degree of movement that is opposed by a spring means the lock mechanism can move if struck, the spring helping to absorb the energy of the strike by controlling that movement and so helping protect the lock mechanism from the strike force.

The connection between the bracket and the shroud may comprise one or more portions of the bracket that engage one or more portions of the shroud such that there is present an amount of free play that defines the limited range of movement.

The portions may comprise protrusions on the shroud or bracket that fit into one or more corresponding recesses or indentations on the other of the bracket or shroud, the protrusions being free to move within the recesses over a limited degree of movement. The limited amount of movement may be determined by the relative position and shape of at least one of the protrusions and a corresponding indent. The protrusions may be relatively rigid, so that in normal use they do not deform. The connection may be such that the bracket is secured to the shroud without the need for any bolts, screw, clips or other mechanical connectors being needed, the bracket and shroud essentially connecting together automatically upon assembly and "hooking" onto one another. The connection may be arranged so that the bracket is a snap-fit onto the shroud.

At least one of the indents may comprise an axially extending groove formed in the shroud, a tab being provided on the bracket which is located within the groove. The tab may be free to slide along the groove during assembly of the bracket to the shroud.

The bracket may be provided with a relatively smooth guide surface that engages a corresponding relatively smooth guide surface on the shroud. They may have a relatively low level of friction between them to help enable the bracket to slide relative to the shroud.

Two grooves may be provided, each one parallel to the axis of the shroud, the bracket having two corresponding lips and the spacing of the two lips of the bracket may be arranged so that the bracket can move axially but is prevented from moving radially or circumferentially about the shroud as the lips move along the grooves. The grooves and lips support and guide the bracket during assembly.

The spring means may comprise a resilient element such as a rubber or soft plastic block. This may be engaged at a first part with the shroud and engaged at a second part with the bracket. It may be compressible and act as a compression spring. It may bias the bracket into a rest position at one end of its limited degree of travel, and provide resistance to movement of the bracket away from the rest position. More than one spring may be provided, or just one spring.

The spring may be retained between the bracket and shroud when installed to prevent the spring from falling out, and to limit access to the spring.

In an alternative the spring may comprise an integral part of the bracket, if the bracket is made of a spring steel or other resilient material, or an integral part of the shroud.

The combination of the connection and the spring means should be arranged so that the largest possible movement within the limited degree of movement is less than that required for the bolt of the lock to be released from the shaft. This may be achieved by limiting movement to at most substantially 5 mm from a neutral position, or thereabout.

The connection and spring means may substantially prevent any movement of the bracket relative to the shroud apart from axially along the shroud.

The bracket may be integrally formed with the lock mechanism. For instance, the lock mechanism may include a casting which accommodates the lock and lock bolt and the bracket may be formed as a part of the casting.

Alternatively, and most preferably, the bracket may include at least one wing which includes an opening for receiving a fixing bolt that in use secures a lock to the bracket.

The lock mechanism may be separate to the bracket and fixed to the bracket by one or more bolts such that the bolt passes through a cut-out in the bracket that is aligned with a through opening provided in the shroud permitting the bolt to pass through into the hollow interior of the shroud to engage the shaft. A circumferentially arranged set of teeth is provided on the shaft and the bolt sits between adjacent teeth to prevent rotation. The teeth may extend axially along the shaft by a sufficient distance to prevent the bolt moving out of engagement with the teeth when the bracket is at the most extreme of its allowable limited range of movement.

The lock mechanism may comprise a casting with the lock located within the casting to prevent attack. The bolt may pass through an opening in the casting that is aligned with the openings in the bracket or shroud. The opening may be oversized relative to the bolt to allow for the limited range of movement without the bolt striking the shroud. The lock mechanism may be key operated or electrically operated, or a combination of both.

The bracket in one arrangement may comprise a relatively rigid metal plate, the connection comprising one or more protrusions that comprise part of the plate. This makes the assembly easier to manufacture, as the shroud typically will be a cast component and also the lock mechanism body will be cast. One or more of the protrusions may be rigid, and one or more may comprise tabs that may be resilient, so that they can deform during assembly of the bracket to the shroud before returning to its un-deformed shape when the bracket is in its installed position. This allows the tab to "spring" into the indent from which it cannot be pulled back out.

The shroud may comprise a casting, or a drawn or rolled (or otherwise formed) metal tube. It may be a one part shroud, or may be formed in two parts which telescope relative to one another to permit reach adjustment of the steering assembly.

The steering column assembly may form a part of a steering apparatus for a road vehicle such as a car, van or truck and may be unassisted or power assisted.

Other advantages of this invention will become apparent to those skilled in the art from the following detailed description of the preferred embodiments, when read in light of the accompanying drawings.

DETAILED DESCRIPTION OF THE INVENTION

Figure 1:
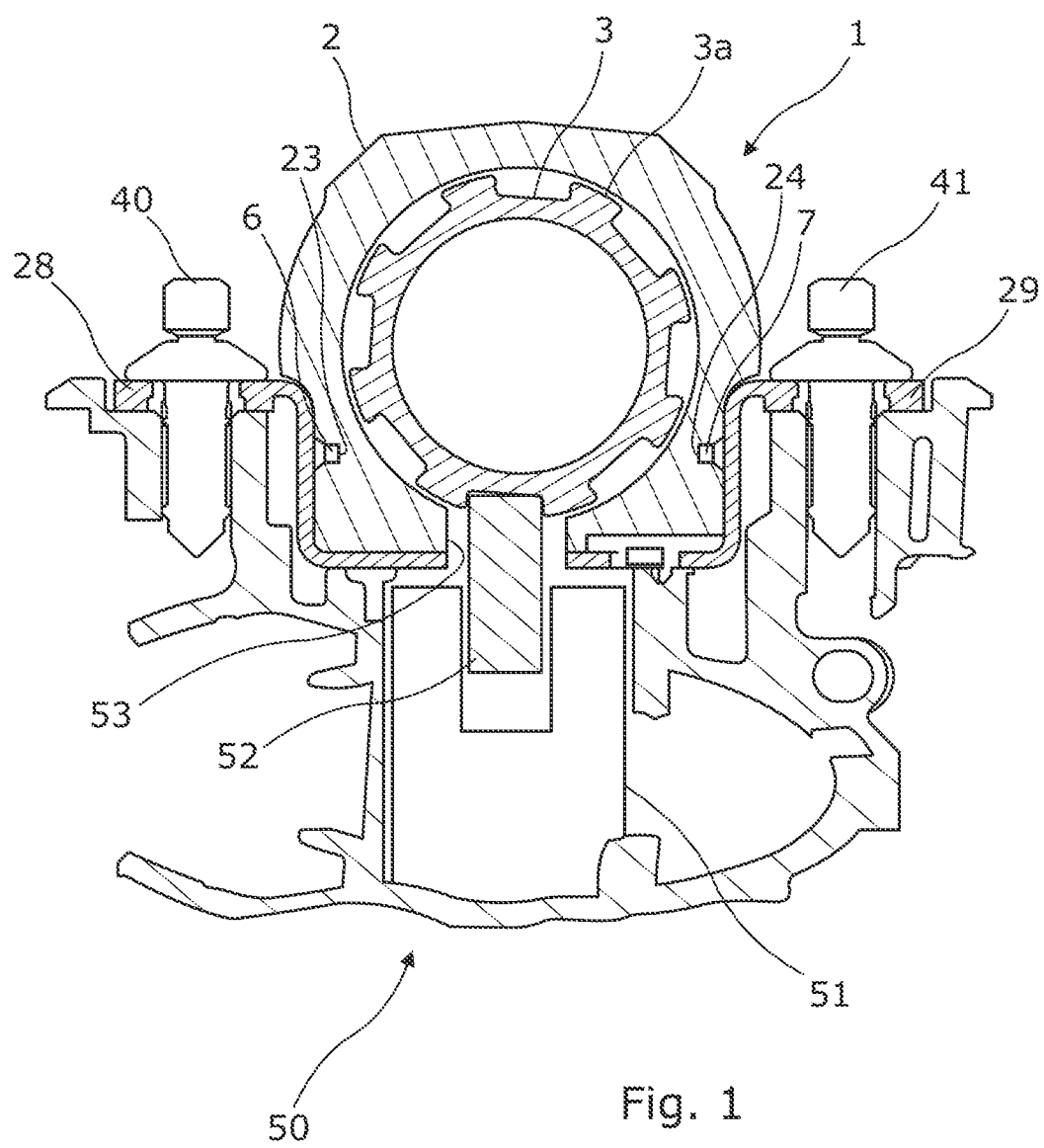
FIG. 1 is a cross sectional view of an embodiment of a steering column assembly of the present invention, the section being taken through the shroud, steering shaft, bracket and lock mechanism.
Figure 2:
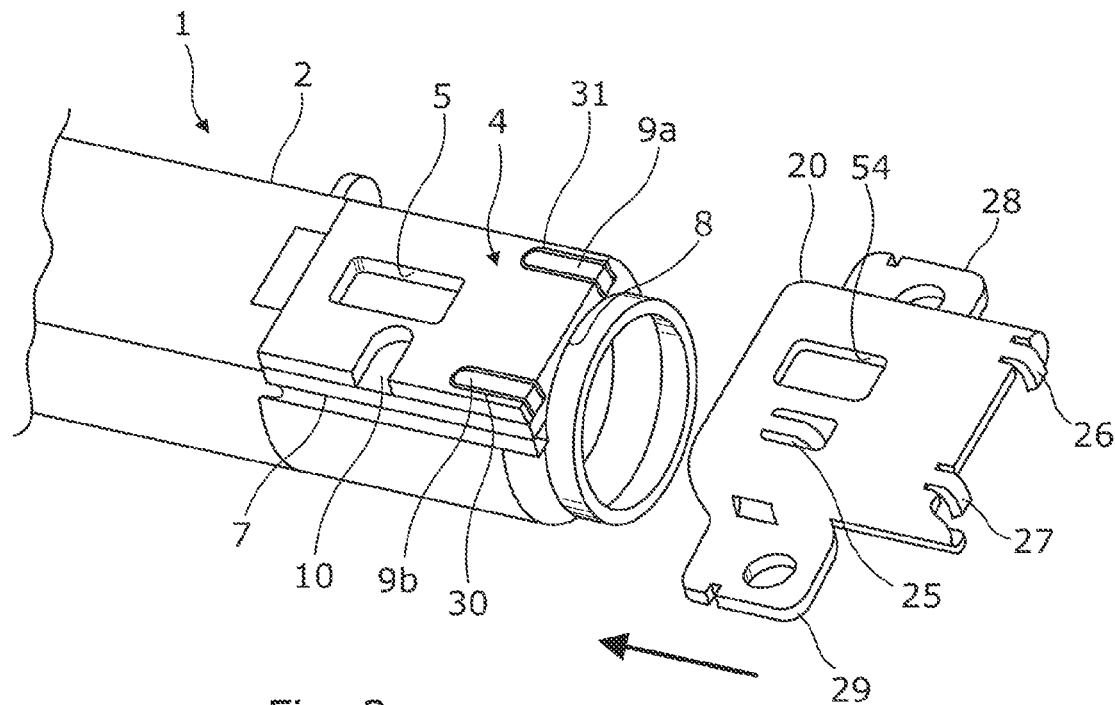
FIG. 2 is an isometric view of a free end of the shroud showing the location of the bracket with the lock mechanism omitted for clarity.
Figure 3:
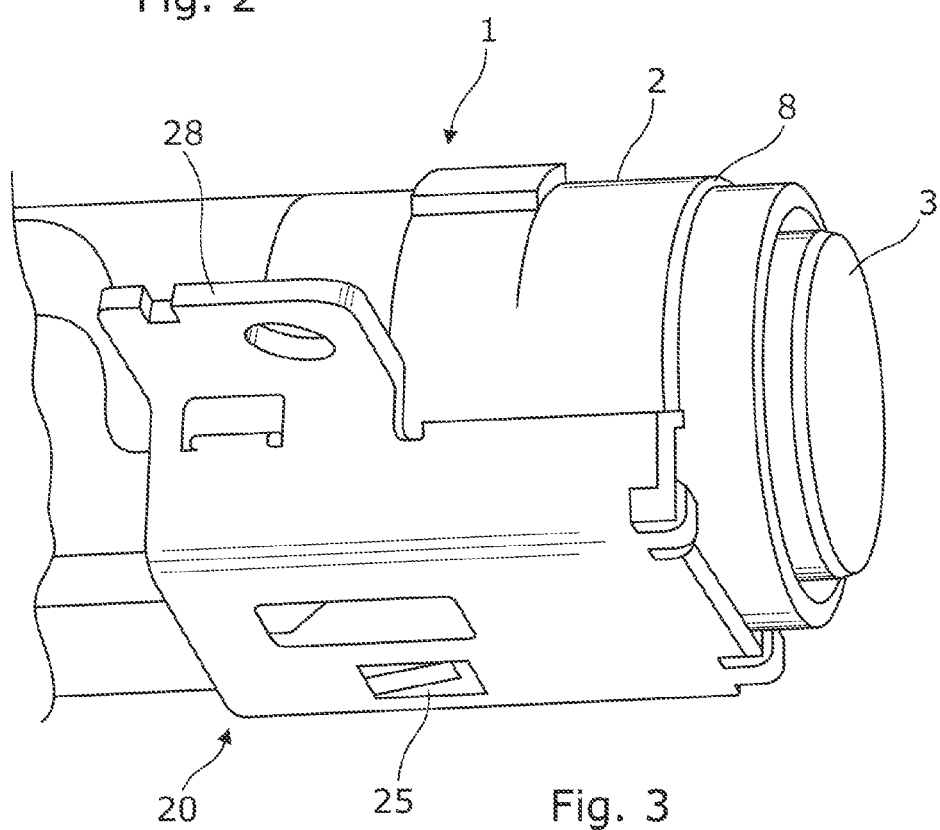
FIG. 3 is a further isometric view of the free end of the shroud and the bracket prior to sliding the bracket onto the shroud, also showing the springs of a spring means.
Figure 4:
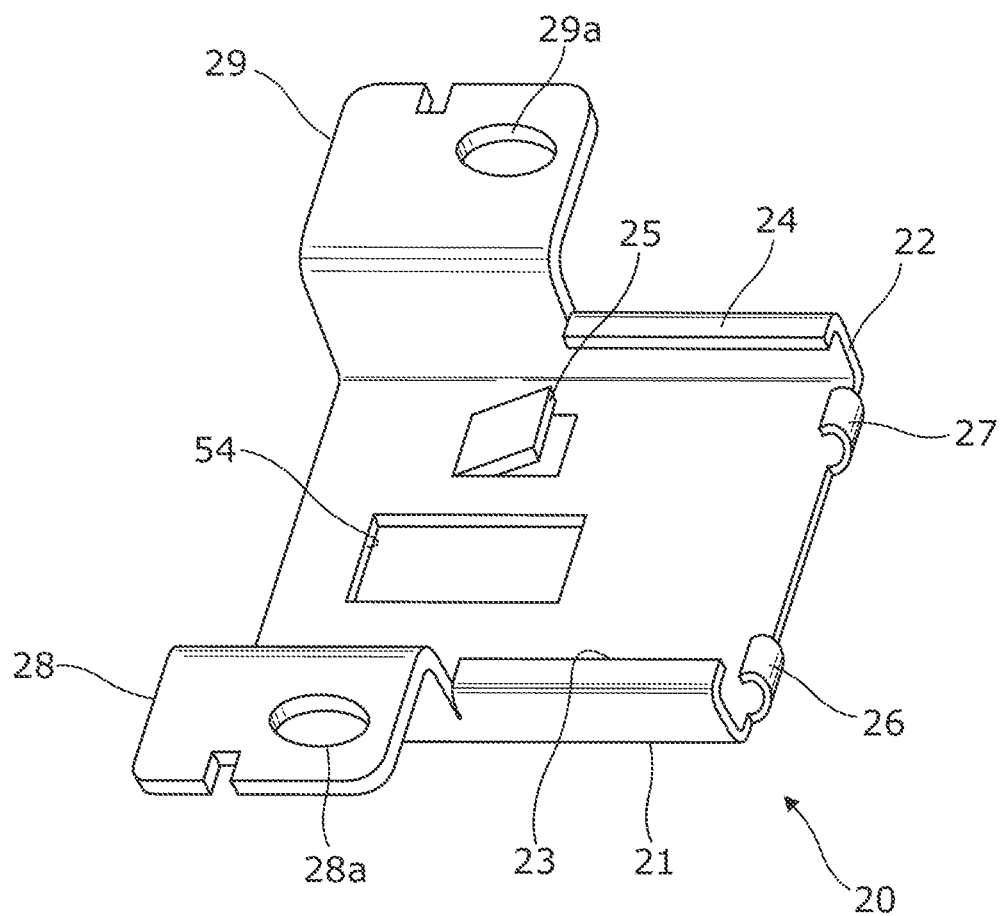
FIG. 4 is an enlarged isometric view of the bracket.

As shown in FIG. 1, a steering column assembly 1 comprises a steering column shroud 2 comprising an elongate, generally tubular, hollow casting which surrounds a steering shaft 3. The steering shaft 3 is supported within the casting by a number of annular bearing assemblies (not shown) so that it can rotate about its axis. One end of the shaft 3 protrudes out from the end of the shroud and, in use, supports a steering wheel (not shown) in a known manner.

A free end of the shroud 2 nearest the steering wheel includes a flattened portion 4 on its underside, roughly rectangular and about 100 mm by 50 mm or so in size. A hole 5 is provided towards the centre of the flattened portion 4, extending right through from the outer surface of the shroud 2 to the hollow inside of the casting. Along the sides of the free end of the shroud 2, about 5 mm above the flattened part 4, are elongate slots 6, 7 which run axially along the length of the casting for a distance corresponding to the length of the flattened portion 4, i.e. for about 100 mm. Each slot 6, 7 is open at the free end 8 of the casting. Several shallow indentations are also provided in the flattened portion 4. Two indentations 9a, 9b are located towards the free end 8, and comprise short slots, around 20 mm long, that extend inwards from the free end 8 of the shroud 2 and run axially along the shroud. They are located on opposing sides of the centre line of the flattened portion 4 of the casting. One other indentation 10 is provided towards the rear of the flattened portion, i.e. away from the free end 8 of the shroud 2. As will be described the flattened portion 4 defines a support surface for a lock mechanism support bracket through which a steering lock mechanism is attached to the shroud.

The bracket 20 comprises a flat metal plate, shaped to compliment the flattened underside of the shroud 2, i.e. about 100 mm by 50 mm. On each edge of the plate, there is an upstanding rib 21, 22 and each rib 21, 22 is terminated with an elongate inwardly directed tab or lip 23, 24. The lips 23, 24 project towards each other about 5 mm above the plate. In use, the bracket 20 is positioned relative to the shroud 2 by sliding the lips 23, 24 into the grooves 6, 7 along the sides of the shroud 2, the flat part of the bracket 20 sitting flush with the flattened portion 4 of the shroud 2.

To prevent the bracket 20 sliding off the shroud 2, the bracket 20 and shroud 2 and provided with various protrusions and indentations that cooperate with one another. The bracket 20 is provided with an upstanding resilient tab 25 that catches in the shallow indentation 10 in the flattened portion 4. Because the resilient tab 25 is of spring steel, it deforms when the bracket 20 is slid onto the shroud 2 before springing out into the indentation 10, and engagement of the tab 25 with the side walls of the indentation 10 prevents the bracket 20 being withdrawn.

One edge of the plate orthogonal to the edges with ribs is provided with two further tabs that are shaped to form relatively hooks 26, 27, formed by the plate material being bent round out of the plane of the plate. These hooks are spaced apart and locate within the pair of indentations 9a, 9b at the free end of the shroud.

A spring 30, 31, comprising a rubber element, is located in each of the indents 9a, 9b and engages the hook 26, 27, being slightly compressed by the hook when the bracket 20 is installed onto the shroud 2. The springs 30, 31 have a profile that is complimentary to the indentations 9a, 9b and are a press fit. The pressure on the springs 30, 31 being determined by the relative spacing between the hooks 26, 27, the tab 25, the side wall of the indentation 10, the side wall of the indentations 9a, 9b and the size of the springs 30, 31.

The bracket 20 in this embodiment also carries two wings 28, 29, one on each side, that extend outwards away from the shroud 2. Each wing 28, 29 carries a bolt opening 28a, 29a that extends from one side of the wing to the other.

Each opening 28a, 29a receives a bolt 40, 41 as shown in FIG. 1 for securing the bracket 20 to a lock mechanism 50. The lock mechanism 50 comprises a casting which has two preformed threaded bolt holes, each receiving one of the securing bolts 40, 41 that pass through the openings 28a, 29a in the wings 28, 29 of the bracket 20. This fixes the casting securely to the bracket 20.

The casting contains a key operated lock assembly 51 having a shoot bolt 52 that can extend and retract through an opening 53 in the casting. This opening 53 is aligned with an opening 54 in the bracket 20, that in turn is aligned with the opening 5 in the shroud. The protrusion of the bolt 52 when extended reaches through the openings to interengage spaced teeth 3a formed around a circumference of the steering shaft 3. This prevents the shaft 3 rotating helping to make the steering secure.

In use the springs 30, 31 resist any axial sliding movement of the plate relative to the shroud 2 away from the free end 8, whilst the tabs/hooks/lips prevent any movement of the shroud 2 towards the free end 8. The bracket 20 is restrained from moving in any other direction by the lips engaged with the grooves 6, 7. The movement against the springs 30, 31 helps to dissipate any energy that is applied by striking the lock mechanism 50. This reduces the possibility of the lock mechanism 50 being deformed to such an extent that the lock is defeated.

In accordance with the provisions of the patent statutes, the principle and mode of operation of this invention have been explained and illustrated in its preferred embodiments. However, it may be understood that this invention may be practiced otherwise than as specifically explained and illustrated without departing from its spirit or scope.

The invention claimed is:

1. A steering column assembly comprising a supporting steering column shroud, a steering shaft that is rotatable within said supporting steering column shroud, a bracket, a steering lock mechanism secured to said supporting steering column shroud by said bracket, said steering lock mechanism including a projecting bolt that acts, when in a locked position, upon said steering shaft to limit the rotation of said steering shaft, in which:

said bracket is secured to said supporting steering column shroud by a connection that permits a limited degree of movement between said bracket and said supporting steering column shroud, said movement being resisted by a resisting force provided by a spring means.

2. A steering column assembly according to claim 1 in which said connection between said bracket and said supporting steering column shroud comprises at least one protrusion on said supporting steering column shroud and said bracket that fits into a corresponding recess on the other of said bracket and said supporting steering column shroud, said at least one protrusion being free to move within said recess over a limited degree of movement.

3. A steering column assembly according to claim 1 wherein said bracket is provided with a relatively smooth guide surface that engages a corresponding relatively smooth guide surface on said supporting steering column shroud.

4. A steering column assembly according to claim 1 wherein a recess is provided which comprises an axially extending groove formed in at least one of said supporting steering column shroud and said bracket, a protrusion being provided on the other of said supporting steering column shroud and said bracket which is slidingly engaged within said groove.

5. A steering column assembly according to claim 4 in which two grooves are provided, each one parallel to an axis of said supporting steering column shroud, and two protrusions that are formed as corresponding lips, each lip being slidingly received in a respective groove, the arrangement of said grooves and said lips being so that said bracket can move axially but is prevented from moving radially about said supporting steering column shroud as said lips move along said grooves.

6. A steering column assembly according to claim 1 in which said spring means comprises at least one resilient element engaged at a first part with said supporting steering column shroud and engaged at a second part with said bracket.

7. The steering column assembly according to claim 6 wherein said at least one resilient member is a rubber block.

8. A steering column assembly according to claim 1 in which said spring means comprises a spring that is retained between said bracket and said supporting steering column shroud when installed to prevent said spring from falling out and to limit access to said spring.

9. A steering column assembly according to claim 1 in which said spring means comprises a spring that is an integral part of said supporting steering column shroud and said bracket.

10. A steering column assembly according to claim 1 in which said bracket is integrally formed with said lock mechanism.

11. A steering column assembly according to claim 1 in which said bracket comprises a metal plate and said connection includes at least one protrusion that comprises part of said plate, said at least one protrusion being resilient, so that said at least one protrusion can deform during assembly of said bracket to said supporting steering column shroud before returning to a less deformed shape when said bracket is in an installed position.

* * * * *